(12) United States Patent
Leimala et al.

(10) Patent No.: US 6,861,037 B1
(45) Date of Patent: Mar. 1, 2005

(54) METHOD OF REMOVAL OF IMPURITIES FROM GOLD CONCENTRATE CONTAINING SULFIDES

(75) Inventors: Raimo Leimala, Pori (FI); Olli Hyvärinen, Pori (FI)

(73) Assignee: Outokumpu Oyj, Espoo (FI)

(*) Notice: Subject to any disclaimer, the term of this patent is extended or adjusted under 35 U.S.C. 154(b) by 286 days.

(21) Appl. No.: 10/048,753

(22) PCT Filed: Aug. 10, 2000

(86) PCT No.: PCT/FI00/00680

§ 371 (c)(1),
(2), (4) Date: Apr. 26, 2002

(87) PCT Pub. No.: WO01/12865

PCT Pub. Date: Feb. 22, 2001

(30) Foreign Application Priority Data

Aug. 12, 1999 (FI) .............................................. 19991718

(51) Int. Cl.$^7$ .......................... C22B 30/00; C01B 19/00
(52) U.S. Cl. .......................... 423/87; 423/509; 423/510
(58) Field of Search .......................... 423/87, 508, 509, 423/510, 27, 47, 38, 150.1, 109, 98

(56) References Cited

U.S. PATENT DOCUMENTS

| | | | | | |
|---|---|---|---|---|---|
| 589,959 | A | * | 9/1897 | Crooke | 75/427 |
| 2,835,569 | A | * | 5/1958 | Reynaud et al. | 75/428 |
| 3,545,964 | A | | 12/1970 | Hansen et al. | |
| 4,342,591 | A | * | 8/1982 | Lesoille | 75/733 |
| 4,615,731 | A | | 10/1986 | Thomas et al. | |
| 4,786,323 | A | * | 11/1988 | Gock et al. | 75/427 |

* cited by examiner

*Primary Examiner*—Steven Bos
(74) *Attorney, Agent, or Firm*—Morgan & Finnegan, LLP

(57) ABSTRACT

The present invention focuses on the method for the removal of impurities, such as tellurium and bismuth, from gold concentrate containing sulfides. According to the present method, the impurities are leached from the gold concentrate with the aid of an acidic aqueous solution, at an elevated temperature, whereby the impurities dissolve and the gold remains in the concentrate.

15 Claims, No Drawings

METHOD OF REMOVAL OF IMPURITIES FROM GOLD CONCENTRATE CONTAINING SULFIDES

The present invention focuses on the method of the removal of impurities, such as tellurium and bismuth, from gold concentrate containing sulfides. According to the present method, the impurities are dissolved from the gold concentrate with the aid of an acidic aqueous solution, at an elevated temperature, whereby the impurities dissolve and the gold remains in the concentrate.

The gold in the gold concentrate containing sulfides appears as metallic or telluride. Additionally, in general the valuable materials present in the concentrate are iron and copper, as well as small amounts of lead and zinc, all of which are sulfides. The impurities bismuth and tellurium appear together as bismuth telluride.

In order to recover the gold, the gold concentrate can be leached by cyanide leaching, but the disadvantage here is the long leaching time and in addition, the gold recovery is only 80% at best.

It is also possible to treat the gold concentrate simultaneously with the copper concentrate, whereby it is conveyed firstly to pyrometallurgical processing, where the gold passes with the copper all the way to the cast copper anodes. The gold in copper electrolysis remains in the so-called anode sludge, from which gold recovery is a separate process. In addition to gold, other metals, which are harmful in the copper refining process, may be present in the gold concentrate. Such metals are, for instance, bismuth and tellurium, which are particularly harmful in copper electrolysis, as their removal is problematic. Thus copper manufacturers are not willing to accept tellurium-containing concentrates.

Now, a method has been developed for the removal of impurities such as bismuth and tellurium from gold concentrate containing sulfides, whereby the impurities in the concentrate are leached, at an elevated temperature, into an acidic aqueous solution. The use of an oxydising agent improves the recovery of impurities into the solution. The elevated temperature means a temperature above the ambient temperature, but the leaching takes place in atmospheric conditions. Dissolution reactions at room (ambient) temperature are too slow for sensible treatment of the concentrate and a beneficial temperature for the reaction is in the range of 50–80° C. The essential features of the present invention are presented in the enclosed claims.

The acidic aqueous solution, whose pH is in the region of 0.5–1.5, optimally 1.0, can be formed from alkali or alkali earth chloride solution by the use of sulfuric acid or hydrochloric solution for pH-educing. If silver is also present in the concentrate, it is beneficial to add sulfuric acid to the chloride solution, as the silver dissolves to a somewhat lesser extent in a chloride solution which contains some sulfate. The use of sole sulfuric acid solution can lead to more foaming than use of a pure chloride or chloride-sulfate solution. It can be beneficial to use for example, sodium chloride, NaCl, or correspondingly potassium, calcium or magnesium chloride as alkali or alkali earth chloride. To increase the effectiveness of the leaching it is also advantageous to use an oxydising agent, which could be for instance hydrogen peroxide, $H_2O_2$, or sodium chlorate. Bismuth dissolves almost totally already for example in alkali or alkali earth chloride solution having a concentration of 50 g/l, but for the leaching of tellurium it is beneficial to use a concentration of 70–300 g/l. It has been proved that, using the present method and in the appropriate leaching time, it is possible to separate over 90% of the bismuth and tellurium in the concentrate.

Gold does not dissolve in the leaching but remains in the leach residue, which is filtered and carefully washed free of chloride. The leach residue, or washed concentrate, is easy to settle and filter and it can be treated in a smelter more economically than the original concentrate. The filtrate, containing metals, is conducted to neutralization, where the tellurium precipitates at a pH value of about 2 and bismuth at a pH value of about 4. Neutralization can be performed, for example with lye, lime, or other alkali. If the precipitation is performed with lime, the sulfate used in leaching is removed off as gypsum.

As other concentrate impurities have also dissolved from the concentrate during leaching, these can also be removed, in any case partly, from the concentrate at the precipitation stage. Thus iron, arsenic and antimony precipitate at the same pH as tellurium, lead precipitates with bismuth. Leaching enables the removal of about ⅔ of the amount of lead from the concentrate and about one third of the amount of arsenic. The precipitated solid matter is removed from the solution by filtration and, after the addition of acid, the solution can be taken back to the leaching stage.

The present invention is also described with the aid of the following examples:

EXAMPLE 1

The gold concentrate was leached for the removal of bismuth and tellurium at different NaCl-concentrations and NaCl and sulfuric acid combinations at a pH value of 1 and at a temperature of 60° C., according to tests 1–4, and at room temperature (25° C.), test 5. The results are shown in Table 1. The table shows first the contents of the different metals of the concentrate, then the results of the tests made under the various conditions. In each test the concentrate was leached for 5 hours; the amount of metal dissolved can be seen in the table as a percentage of the amount of metal contained in the original concentrate, for every test, as a function of time.

As indicated in the table, from the total standpoint the most beneficial results were achieved with a concentration of 100 g/l NaCl and when the pH value was kept at ≦1.0 with the aid of sulfuric add.

TABLE 1

| Conc. | Au ppm 312 | Ag ppm 41 | Bi % 0.77 | Te % 0.93 | Cu % 0.16 | As % 0.07 |
|---|---|---|---|---|---|---|
| Test 1 | NaCl 200 g/l, Temp. 60 C., Solubility, % | | | | | |
| ½ h | <0.5 | 43.9 | 78.5 | 60.4 | 4.3 | 23.9 |
| 1 h | <0.5 | 70.9 | 97.8 | 59.7 | 5.5 | 4.7 |
| 2 h | <0.5 | 70.9 | 96.5 | 77.3 | 5.8 | 16.2 |
| 3 h | <0.5 | 68.9 | 93.9 | 82.3 | 6.2 | 23.3 |
| 5 h | <0.5 | 70.9 | 98.5 | 84.1 | 6.8 | 25.1 |
| Test 2 | NaCl 100 g/l, Temp. 60 C., Solubility, % | | | | | |
| ½ h | <0.5 | 32.1 | 70.1 | 64.7 | 4.7 | 24.4 |
| 1 h | <0.5 | 55.8 | 96.7 | 68.1 | 8.3 | 8.3 |
| 2 h | <0.5 | 66.3 | 96.9 | 71.3 | 7.7 | 9.5 |
| 3 h | <0.5 | 83.2 | 94.2 | 86.8 | 7.8 | 22 |
| 5 h | <0.5 | 82.2 | 98.4 | 85.7 | 8.1 | 22.8 |
| Test 3 | NaCl 50 g/l, Temp. 60 C., Solubility, % | | | | | |
| ½ h | <0.6 | 15 | 48.1 | 37.1 | 3.5 | 28.3 |
| 1 h | <0.6 | 80.6 | 63.8 | 51.5 | 8.2 | 9.4 |
| 2 h | <0.6 | 40.4 | 98.3 | 67 | 8.5 | 9.7 |
| 3 h | <0.6 | 30.3 | 86.8 | 77.5 | 7.8 | 20.1 |
| 5 h | <0.6 | 35.3 | 83.3 | 84.4 | 8.7 | 20.1 |
| Test 4 | NaCl 100 g/l, H2SO4, Temp. 60 C., Solubility, % | | | | | |
| ½ h | <0.6 | 32.7 | 75.8 | 58.8 | 4.8 | 26.1 |
| 1 h | <0.6 | 59.9 | 98.3 | 89 | 5.6 | 14.6 |
| 2 h | <0.6 | 65.4 | 96.9 | 82.9 | 6.3 | 21.6 |
| 3 h | <0.6 | 43.6 | 91.4 | 60.5 | 6.3 | 23.8 |
| 5 h | <0.6 | 45.6 | 90 | 82.6 | 6.4 | 23.9 |
| Test 5 | NaCl 100 g/l, Ambient temp., Solubility, % | | | | | |
| ½ h | <0.1 | 1.6 | 14.3 | 9.8 | 1.2 | 22 |
| 1 h | <0.1 | 3 | 16.1 | 12.6 | 1.4 | 24.3 |
| 2 h | <0.1 | 8.9 | 16.2 | 14.7 | 1.7 | 23.1 |
| 3 h | <0.1 | 11.6 | 20.3 | 16.7 | 1.9 | 23.7 |
| 5 h | <0.1 | 12.3 | 22.8 | 18.9 | 1.9 | 24 |

EXAMPLE 2

In the solution obtained from the gold concentrate leaching, the pH of the solution was 0.6, the impurities were precipitated by the addition of lye, so that the pH was raised to the value of 2.0, then to the value of 4.0, after which to the value of 6.0 and finally to the value of 7.0. The results are presented in Table 2.

TABLE 2

| Solution | pH | Element Unit | Au mg/l | Ag mg/l | Bi mg/l | Te mg/l | Cu mg/l | Pb mg/l | Fe mg/l | As mg/l |
|---|---|---|---|---|---|---|---|---|---|---|
| Start sol. | 0.04 | | <1 | 16 | 3830 | 4130 | 68 | 195 | 6320 | 77 |
| | 2 | | <1 | 14 | 2200 | 658 | 57 | 160 | 1260 | 3 |
| | 4 | | <1 | 12 | 3 | <1 | 68 | 8 | 918 | 1 |
| | 6.06 | | <1 | 13 | 1 | <1 | 51 | 3 | 14 | 1 |
| | 7.02 | | <1 | 12 | <1 | <1 | 27 | <1 | 1 | <1 |

What is claimed is:

1. A method for the removal, from a gold concentrate containing sulfides, of impurities selected from the group consisting of tellurium and bismuth, the method comprising leaching, at an elevated temperature, the impurities from the gold concentrate in an aqueous alkali metal chloride or alkaline earth metal chloride solution at a pH between 0.5 and 1.5, where the amount of aqueous alkali metal chloride or alkaline earth metal chloride is at least 50 g/l, to dissolve the impurities and leave the gold in a leach residue for subsequent recovery.

2. A method according to claim 1, wherein the elevated temperature is between 50° C. and 80° C.

3. A method according to claim 1, wherein the amount of aqueous alkali metal chloride or alkaline earth metal chloride is between 50 g/l and 300 A.

4. A method according to claim 1, wherein the aqueous alkali metal chloride or alkaline earth metal chloride solution is NaCl solution.

5. A method according to claim 1, wherein the aqueous alkali metal chloride or alkaline earth metal chloride solution is acidified with sulfuric acid.

6. A method according to claim 5, wherein the amount of sulfuric acid in the aqueous alkali metal chloride or alkaline earth metal chloride solution is at least 10 g/l.

7. A method according to claim 1, wherein the aqueous alkali metal chloride or alkaline earth metal chloride solution is acidified with hydrochloric acid.

8. A method according to claim 7, wherein in that the amount of hydrochloric acid in the aqueous alkali metal chloride or alkaline earth metal chloride solution is at least 10 g/l.

9. A method according to claim 1, further comprising using an oxidizing agent in the leaching.

10. A method according to claim 9, wherein the oxidizing agent is hydrogen peroxide, $H_2O_2$.

11. A method according to claim 9, wherein the oxidizing agent is sodium chlorate.

12. A method according to claim 1, further comprising:
   filtering the leach residue after the removal of impurities;
   washing the leach residue; and
   conducting the leach residue to pyrometallurgical treatment.

13. A method according to claim 1, further comprising neutralizing a filtrate containing the impurities to precipitate the impurities.

14. A method according to claim 13, wherein the filtrate, from which the impurities are precipitated, is conducted back to leaching.

15. A method according to claim 1, wherein the amount of aqueous alkali metal chloride or alkaline earth metal chloride is between 70 g/l and 300 g/l.

* * * * *